(12) United States Patent
Grassi (10) Patent No.: US 7,771,158 B2
(45) Date of Patent: Aug. 10, 2010

(54) POWER TOWERS/INNOVATIVE METHOD OF POWER EXTRACTION USING STATIC AIRFOILS

(76) Inventor: Frank Grassi, 1793 Manchester Blvd., Grosse Pointe Woods, MI (US) 48236

( * ) Notice: Subject to any disclaimer, the term of this patent is extended or adjusted under 35 U.S.C. 154(b) by 374 days.

(21) Appl. No.: 11/671,585

(22) Filed: Feb. 6, 2007

(65) Prior Publication Data

US 2008/0211234 A1    Sep. 4, 2008

Related U.S. Application Data

(60) Provisional application No. 60/771,574, filed on Feb. 8, 2006.

(51) Int. Cl.
*F03D 9/00* (2006.01)
(52) U.S. Cl. .................. 415/1; 415/4.1; 415/148; 415/905; 416/93 R; 290/44; 290/55
(58) Field of Classification Search .............. 415/1, 415/2.1, 4.1, 148, 905; 416/93 R; 290/44, 290/55
See application file for complete search history.

(56) References Cited

U.S. PATENT DOCUMENTS

| | | | | |
|---|---|---|---|---|
| 4,039,848 A | * | 8/1977 | Winderl | 290/55 |
| 4,070,131 A | * | 1/1978 | Yen | 415/4.4 |
| 4,275,309 A | * | 6/1981 | Lucier | 290/1 R |
| 4,309,146 A | * | 1/1982 | Hein et al. | 415/4.4 |
| 4,415,814 A | * | 11/1983 | Martinez | 290/55 |
| 4,508,973 A | * | 4/1985 | Payne | 290/55 |
| 4,935,639 A | * | 6/1990 | Yeh | 290/55 |
| 4,963,761 A | * | 10/1990 | Wight | 290/55 |
| 6,626,636 B2 | * | 9/2003 | Bohn | 415/1 |
| 6,939,101 B2 | * | 9/2005 | Yu et al. | 415/4.2 |

* cited by examiner

*Primary Examiner*—Igor Kershteyn
(74) *Attorney, Agent, or Firm*—Wildman, Harrold, Allen & Dixon LLP (57) ABSTRACT

An airfoil shaped tower the size of a skyscraper for the production of electrical power using turbines. The turbines are located at the base of the tower and are fed by ambient air. Power to turn the turbines comes from the pressure drop generated by the wind moving over a changing surface of the airfoil. (Bernoulli's Equation). The areas of negative pressure on the exterior surface are covered by a plurality of bleeder vents that conduct air from the high-pressure (ambient air) interior to the low-pressure exterior. The invention is further improved by the construction of several towers in close proximity. Adjacent towers augment the air velocity thus increasing the pressure differential. The power of the turbines is greatly increased because power is proportional to the effective wind velocity cubed.

34 Claims, 9 Drawing Sheets

| $\theta$ | $2V_o \sin\theta$ |
|---|---|
| 0 | $2V_o \sin 0° = 0$ |
| 30° | $2V_o \sin 30° = V_o$ |
| 60° | $2V_o \sin 60° = 1.73 V_o$ |
| 90° | $2V_o \sin 90° = 2 V_o$ |

Top View

POWER TOWERS/INNOVATIVE METHOD OF POWER EXTRACTION USING STATIC AIRFOILS

CROSS-REFERENCE TO RELATED APPLICATION

This application relates to provisional patent application No. 60/771,574 filed on Feb. 8, 2006.

FIELD OF THE INVENTION

This invention relates generally to the conversion of wind energy to electric power, and is particularly directed to apparatus and a method for extracting and converting wind energy to electric power using static airfoils and turbines.

BACKGROUND OF THE INVENTION

Electric power from the wind will always need high capital investment because the density of the medium is so low. Better generating equipment and standardized design has made wind power using horizontal axis turbines with some subsidies competitive to coal and gas power plants. The cost of wind generated electricity is now between 0.03 to 0.08 dollars per kilowatt hour. This cost needs to be reduced to 0.03 dollars or less to create the critical mass that would overcome the "technological momentum" of the coal, gas and oil based power. One advantage is wind power does not contribute to the greenhouse effect caused by the burning of hydrocarbons that produce $CO_2$.

Water currents are also being harnessed to produce electrical power. The energy in the currents is kinetic rather than potential. In a typical tidal stream installation, a turbine might be placed underwater to extract the energy. It's an underwater equivalent of a wind power generator.

The state of the art wind power turbines have in the past 10 years has taken giant leaps. This was accomplished by scaling-up the wind turbines to immense sizes. Rotor diameters on some of the new turbines have reached 400 ft and tower height of 600 ft. The reason that large diameter is more desirable is because the power goes up per the square of the rotor diameter. These titans of the wind industry generate 5 MW each. The rotational speed per minute is about the same as wind speed thus the speed of the rotor tip has reached a maximum above which acoustic noise is an undesirable byproduct. This immense size has reached a plateau so that they can not be scaled up by further increasing blade diameter.

Another limiting factor is that large amount of land is used because wind farms need to spread out so that one rotor does not diminish the power of the adjacent rotors. Wind turbines need to be separated by up to seven rotor diameters. Some new wind farms now require 21,000 acres near population centers that can use the power they produce. They are sometimes being planed near resort towns and are unsightly even as they are located out at sea.

Wind often doesn't blow when needed. The demand for electricity is continuous but variable while energy from the wind is intermittent and variable thus supply and demand seldom matches. The turbines must feed the electric grid but they normally supply only a fraction of the total demand, the rest must still come from other sources. At other times supply exceeds demand. Denmark which can generate 20% of its power from wind often sells the access power at very low prices because the increase capacity on a windy day is not needed. Coal, gas and oil fired plants thus make up the bulk of electrical generating capacity and adding more wind generating capacity will not make economic sense. The market is then said to be saturated. When this happens or when the wind doesn't blow the large capital investment in wind power is idle and thus unproductive. Another deficiency is that the access energy is wasted because it is too expensive to store it for later use.

The typical horizontal-axis turbines under optimal wind conditions can operates at 59% or less of maximum available power. This is known as Betz limit. Statistics for turbines in Denmark is that they produce at 50% and as a rule of thumb 1000 $kWh/m^2$ per year. The state of the art turbines are marvels of technology; they use the most advanced materials but are limited by Betz limit and the area of the rotor. The power tower on the other hand is not limited in size. It can operate at 90% of maximum available power and up to four times velocity cubed. The power towers can overcome most of the deficiencies of the horizontal-axis turbines, while at the same time using the same components. This is the machine that will power the new century.

BRIEF SUMMARY OF THE INVENTION

The invention starts with one or more towers in the shape of airfoils. They are the size of a skyscrapers (1000 ft. high or more). The towers base is the size of a football field. Its purpose is the production of electrical power. The major difference is that the turbines are located around the base of the tower, are fixed mounted and fed by ambient air. Power comes from the pressure drop generated by the wind moving over a changing surface of the airfoil. (Bernoulli's Equation). The areas of negative pressure on the exterior surface, are covered by a plurality of bleeder vents that conduct air from the high-pressure (ambient air) interior to the low-pressure exterior. The invention is further improved by the construction of several towers in close proximity. Depending on the closeness of the spacing between them, adjacent towers augment the air velocity of thus further increasing the pressure differential. The power of the turbines is greatly increased because power is proportional to the effective wind velocity cubed.

Every machine is a combination of two parts: the static and dynamic. In this case the airfoil is truly static and not a convenient contrivance that imagines a plane's airfoil as stationary and the air moving around it. A simple method of analyzing airfoils can be done by imagining the tower as a cylindrical tower. Its exterior skin is smooth and covered by vents "bleeder slots" that conduct air from the high-pressure interior to the low-pressure exterior. It will be shown that the pressure difference even for low wind velocity is significant and that a series of towers will augment the differential pressure ($\Delta p$). Thus the velocity will be greatly increased and as a consequence the power which is proportional to the effective wind velocity cubed $v^3$. The advantages of this invention are patent.

Other advantages are:

The nacelles do not need to rotate to face the wind, and one or more of the turbines may be serviced while the others are still operating.

Increasing tower height results in a proportional increase in power. This allows the design of the towers to be customized for a specific site in order to optimize the velocity of air across the turbines.

The large volume of air contained by the tower reduces the variances in wind velocity.

More accurate control turbine rotational speed thus making the integration of the power to the grid easier.

Larger scale centralized system reduce cost of electrical energy.

As an example a single tower would have ten (10) turbines each rated 2.5 MW and a series 10 towers could generate 250 MW.

This larger scale system will greatly reduce use of valuable land resources. The wind is free but the land rated for high winds is precious and limited.

The system can be upgraded to produce hydrogen by electrolysis. Hydrogen produced by wind power could power fuel cell cars or it could be stored and burned to produce electrical power during periods of low wind. The exhausted hot air could again power the turbines at the base of the tower.

Hydrogen generating electrolyzers can produce hydrogen fuel (high purity and pressure) anywhere electricity and water are available, they utilize electrolysis with a simple fluid electrolyte. Electrolyzers can produce the high-pressure hydrogen (up to 10,000 psi) needed for efficient storage and distribution, without a separate compressor.

A small electrolyzer can produce hydrogen at home. No need to build a hydrogen infrastructure. Hydrogen can be produced at night when rates are low.

Energy can be added to the grid as needed even if the wind doesn't blow by using hydrogen as a fuel for a gas-turbine hybrid system and the towers as the stack.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

The hot exhaust air passes over a curved surface, similar to an airfoil; a low pressure area is created inducing the ambient air to flow into the throat with the high velocity exhaust air causing the mixing of hot exhaust and ambient air.

DETAILED DESCRIPTION OF THE PREFERRED EMBODIMENTS

Air and water forces have their origin partly in the shape of the obstacles deforming the free motion of the fluid and in the flow condition of its surface. Both factors contributing at the same time. The mechanism is not too difficult to picture. Layers or the term laminar is applied to a flow pattern in which the fluid may be divided into parallel layers which flow past one another at various velocities and as a result the faster moving layers tend to drag the neighboring layers along thus accelerating them. Reciprocally, the slower layers tend to retard the faster ones.

Analyzing step by step an ideal fluid flow pattern around a simple circular cylinder shaped airfoil we establish the relationship between shape of the airfoil, induced velocities, pressure and resulting forces i.e. lift as induced negative pressure (the same arguments apply to water flow).

Figure 1:
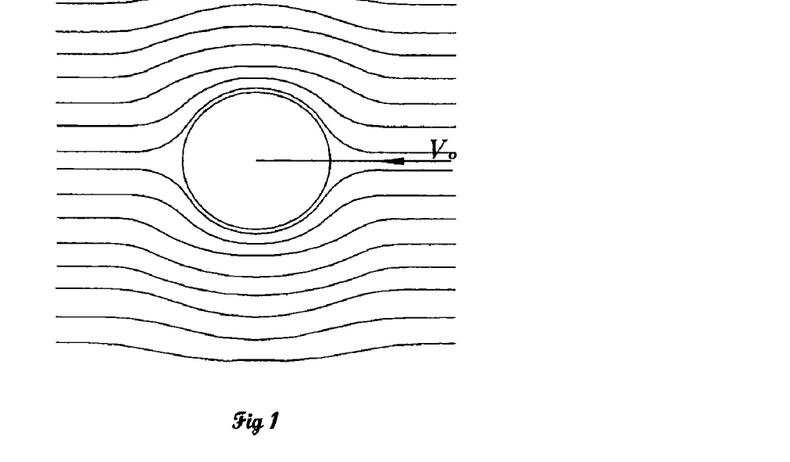
FIG. 1 represents an ideal fluid as a frictionless flow pattern around a cylinder.

FIG. 1 represents an ideal fluid as a frictionless flow pattern around a cylinder. The streamlines represent the various layers of air as ideal flow without any separation i.e. without laminar separation or surface friction.

The wind velocity at various points around the cylinder is given by:

$$V = 2V_o \sin \theta \qquad \text{Eq. 1}$$

Figure 3:
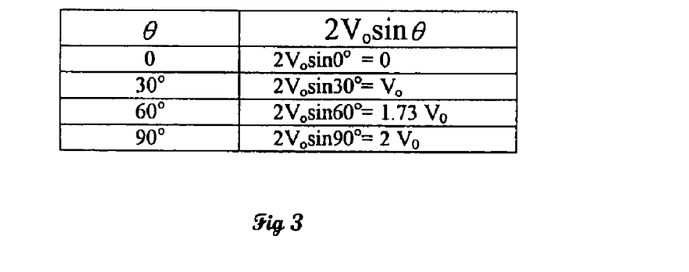
FIG. 3 represents plot the velocity at different angles.

The flow patter is symmetrical about the axis $S_1 S_2$ and is parallel to the undisturbed free flow velocity $V_o$. The spacing of the streamlines indicates the magnitude of the velocity. The closer the spacing the higher the speed. At sufficiently distance the lines are straight and parallel. The figure is thus also a map of the velocity field. From Eq. 1 we plot the velocity at different angles. These values are tabulated in FIG. 3.

If the velocity distribution is known, the pressure distribution can be found by invoking Bernoulli's theorem. It states that along a given streamline, the sum of the static pressure "p" and the dynamic pressure ($\frac{1}{2}\rho V^2$) is constant. This can be expressed by:

$$p + \frac{1}{2}\rho V^2 = p_o + \frac{1}{2}\rho V_o^2 = \text{constant.} \quad \text{Eq 2}$$

$$q = \frac{1}{2}\rho V^2 \quad \text{Eq 3}$$

Where $\rho$ is the mass density of the fluid whose units are lb-sec$^2$/ft$^4$. Eq 2 can also be expressed as:

Pressure head+Velocity head=Total head(constant)

Bernoulli's theorem can also be regarded as an expression of the law of energy conservation, i.e. the sum of the potential and kinetic energy is a constant. In this case the dynamic pressure represents the amount of work the wind can do by virtue of its motion. At $S_1$ the stagnation point, V=0 and the stagnation pressure is computed:

$$p + \frac{1}{2}\rho(0)^2 = p_o + \frac{1}{2}\rho V_o^2$$

$$p = p_o + \frac{1}{2}\rho V_o^2$$

$$p = p_o + q_o$$

Figure 4:
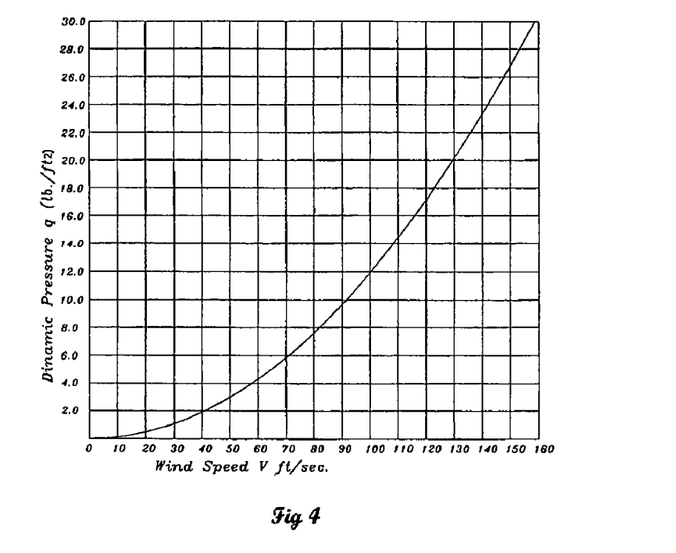
FIG. 4 represents local change in pressure $p-p_o$ as related to the local change in velocity.

The stagnation pressure p at $S_1$ is higher than the ambient pressure $p_o$ by the amount of dynamic pressure $q_o$. It is the stagnation pressure that is greater then the ambient pressure that feeds the air to the turbines. The dynamic pressure q, we will use to calculate the local change in pressure $(p-p_o) = \Delta_p$ and the graph FIG. 4 gives us the corresponding values of q for various wind speeds in ft/sec.

Thus ambient pressure is $p_o$=2116.2 lb/ft$^2$ or 14.7 lb/in$^2$ "standard atmospheric pressure of 1 atm" at sea level with $\rho$=0.00238 lb-sec$^2$/ft$^4$.

Applying Eq. 2 we find the local change in pressure p–p$_o$ is related to the local change in velocity by:

$$p - p_o = \frac{1}{2}\rho V_o^2 - \frac{1}{2}\rho V^2$$

$$= \frac{1}{2}\rho V_o^2 ((V_o^2 - V^2)/V_o^2)$$

$$= \frac{1}{2}\rho V_o^2 (1 - (V^2/V_o^2)) \text{ and since}$$

$$q_o = \frac{1}{2}\rho V_o^2$$

$$p - p_o = q_o(1 - (V^2/V_o^2))$$

and dividing both sides by $q_o$ $$(p-p_o)/q_o = 1 - (V^2/V_o^2) = C_p$$

thus:

$$C_p = \Delta_p/q_o = 1 - (V/V_o)^2 \quad \text{Eq. 4}$$

$C_p$ is a dimensionless pressure coefficient, the ratio of static pressure and dynamic pressure. $\Delta_p = p - p_o$ is the differential pressure, i.e. the difference between ambient pressure $p_o$ and the local pressure p at a given point along the surface of the cylinder.

Thus, a decrease in local velocity, giving V less than $V_o$ leads to an increase in the value of local pressure p so that (p–p$_o$) is positive and conversely an increase in V, or acceleration to a value greater than $V_o$, leads to a decrease in local pressure p so that (p–p$_o$) is negative. Negative is good . . . for power generation!

This is a consequence of Bernoulli's equation which seems at first counter to everyday experience, for it is instinctive to equate high pressure with high velocity and vice versa. A little reflection, shows that Bernoulli correctly locates the regions of low pressure where velocity is greater and where air or water move faster then where they are retarded.

In an ideal fluid no energy is dissipated due to friction only velocity and pressure change. If friction is present as in the motion of real fluids, Bernoulli can still be applied as an approximation, as is the case for prevailing winds which move at relatively low velocities and have low viscosity. The geometric simplicity of the cylindrical airfoil can also be used to approximate the velocity and pressure changes of a NACA airfoil.

At the stagnation point $S_1$, $C_p$ can never be greater than 1. For a single airfoil $\Delta_p$ can be calculated thus:

$$C_p = \Delta_p/q_o = 1 - (V/V_o)^2 = 1 - (0/V_o)^2 = 1$$

$\Delta_p/q_o = 1$ therefore $\Delta_p = q_o$

This can be regarded as the maximum kinetic energy available from the air stream that can possibly be converted. This maximum is applicable to a single airfoil; the invention uses several airfoils to multiply the velocity to more effectively use the power of the wind.

If the ambient pressure $p_o$ is 2116 lb/ft$^2$ (standard atmospheric pressure) and the cylinder is subjected to a wind velocity of 40 ft/sec at point B on the cylinder, $q_o$ can be found from Eq. 3 or from graph FIG. 4 and is 1.9 lb/ft$^2$. From the calculations at point B, the local velocity V is twice $V_o$ i.e.

$$V/V_o = 2$$

Substituting this ratio into Eq. 4 yields:

$$C_p = \Delta_p/q_o = 1 - (2)^2 = -3$$

This means that at point B there is a decrease in pressure below the ambient pressure $p_o$; and this decrease or negative differential pressure is $\Delta_p = -3q_o$. Therefore for a wind velocity of 40 ft/sec, $q_o$=1.9 lb/ft$^2$, the negative pressure $\Delta_p$ or suction at point B is:

$$\Delta_p = C_p \times q_o = -3 \times 1.9 = -5.27 \text{ lb/ft}^2$$

Figure 5:
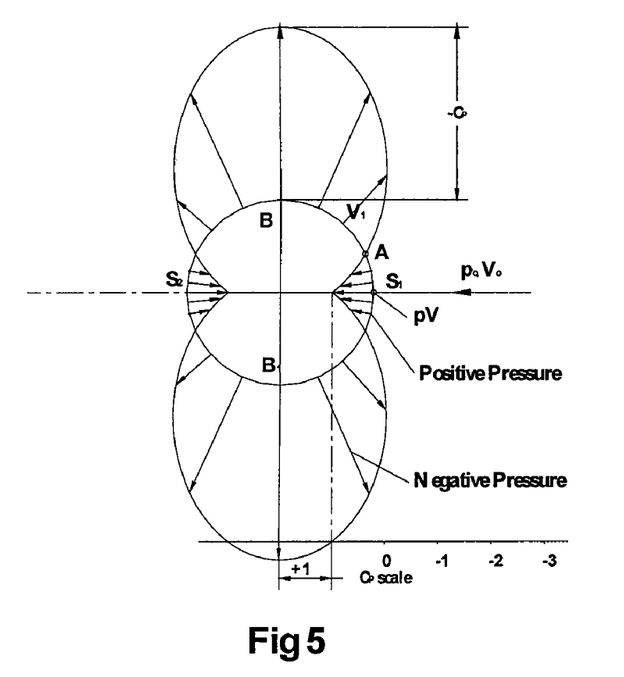
FIG. 5 represents a pressure graph at various angles around the cylinder.

Repeating this procedure we can find the differential pressure for any angle $\theta$ around the cylinder. Arrows pointing inwards indicate positive pressure and arrows pointing away from the cylinder surface indicate a negative pressure coefficient $-C_p$ or negative pressure differential $-\Delta_p$. Negative means a pressure drop below ambient pressure $p_o$. With these values we can draw a pressure graph FIG. 5. Note that $-C_p$ is the maximum negative pressure coefficient resulting in maximum pressure differential $\Delta_p$. If we add all the positive and negative pressures around the cylinder we find that they cancel each other, hence the resultant sum is =0.

This was the paradox that puzzled mathematicians for 150 years. Finally L. Prandtl explained it thus: the flow around a foil in real fluids is in the form of layers. One layer very close to the surface is affected by friction drag or viscosity but fortunately it is a very thin layer called boundary layer. These layers can be described by classical methods of fluid dynamics.

The preferred shape of the towers will be one of the many NACA foil shapes. These shapes also include airfoils that are symmetrical. Wind typically comes from a specific direction and at another part of the day reverses direction, thus the shape can be symmetrical for both axis, and they could look like an ellipse. The correct one will be determined for each site based on local wind, surface topography and airflow of multiple towers. These calculations become more complex when several towers are aligned and offset close together and oriented for prevailing wind direction, wind speed and other factors. Lucky for us Computational Fluid Dynamics (CFD) can come to the rescue but for now, for the purpose of understanding the concepts, the solution can be done by pure geometry.

Figure 6:
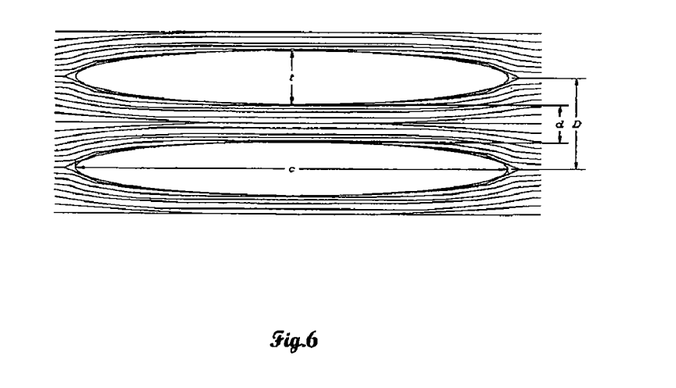
FIG. 6 represents the augmenting (multiplying) the wind velocity by adding another similar airfoil.

NACA foils can be still be analyzed as an approximation of the above cylindrical foil. We can then augment (multiply) the wind velocity by adding another similar symmetrical airfoils FIG. 6. Under steady flow conditions wind velocity is inversely proportional to the area. If the towers are the same height then the velocity is inversely proportional to the narrowing of the distance "d" between the adjacent towers. Thus as an example for initial wind speed $V_o$ and for a suitable distance d, the effective speed is $V=4V_o$.

Thus the effective wind velocity is increased by a factor of 4 and:

$$V/V_o=4$$

and $$C_p=\Delta_p/q_o=1-(V/V_o)^2=1-(4)^2=-15$$

For a wind speed of $V_o$=40 ft/sec (27 miles/hour) the differential pressure $\Delta p$ can be calculated:

$$\Delta_p=C_p \times q_o=-15 \times 1.9=-28.5 \text{ lb/ft}^2$$

Figure 7:
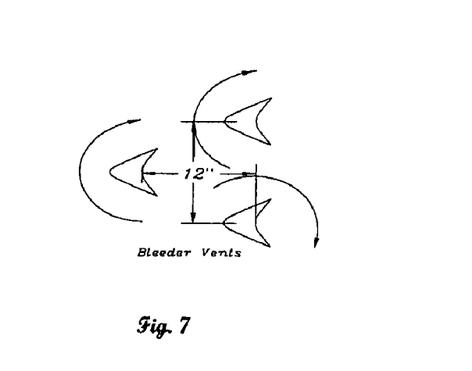
FIG. 7 represents diffused bleeder vents offset from each other and with the capability of rotating 180° depending on wind direction.

So what generates the power? This is the answer! The power towers! Its surface is smooth but covered with bleeder vents that while they protrude into the boundary layer they are designed so as to minimize air resistance and the air escaping from them will be directed parallel to the boundary layer at the same direction and velocity as the wind close to its surface. The vents will act similarly to vortex generators and will help reduce boundary layer surface friction, thus increase power. The size of the towers can be smaller and deployed by mobile trailers with airfoils that are assembled on site or telescope, tethered and capable of being quickly deployed. They can be rotated for variances in wind direction and used to generate power at remote locations. Power towers can also be as tall as the highest skyscrapers and fixed to the mean direction of the prevailing wind. The height and size can be scaled to any size. The sky is the limit. Its construction can be assembled from a structural steel framed structure with a curtain wall skin. The most economical method of construction is to form the towers from reinforced concrete that is slipped formed. The bleeder vents installed as the tower rises. The bleeder vents opening and closing would be mechanically controlled, metering the volume of air escaping. The number, shape and size of the bleeder vents will be determined by the particular chosen set of optimal factors based on Computational Fluid Dynamics (CFD) studies, as an example FIG. 7 shows a series of bleeder vents at 1 ft×1 ft spacing and offset from each other and with the capability of rotating 180° depending on wind direction.

The vents can be set at any spacing and their opening size can be made as small as ⅛ inch or as large as 4 inches square in area. The negative surface areas for a single 1000 ft tall tower could be covered by 250,000 bleeder vents averaging 4 in². Thus if vents connecting the exterior to the interior are conduit 4 in², then the total area of all the openings is:

$$250,000 \times 4 \text{ in}^2 \times \left(\frac{1 \text{ ft}^2}{144 \text{ in}^2}\right) = 6,944 \text{ ft}^2 \text{ or } (645 \text{ m}^2)$$

This total area of the vents can be made to match the total area often (10) turbines each 30 ft in diameter which is approximately 7,068 ft², thus keeping the wind powering the turbines the same as the volume and velocity of the air escaping to the air stream because of the difference in pressure.

From Eq. 3 or graph FIG. 4, with initial wind speed $V_o$=40 ft/sec, the pressure drop is 28.5 lb/ft², solving for v the effective wind speed escaping from the vents is:

$$v_1=\sqrt{2p/\rho}$$

The effective wind speed of $v_1$=154 ft/sec or 105 miles/hour. (46.95 m/sec) This is as expected since $V=4V_o$.

Power of the Wind the Cube of the Wind Speed

The energy content of the wind varies with the cube of the wind speed. The formula for maximum power of a rotor with swept area A in watts with no rotor to block the wind is:

$$P=½\rho v^3 A \qquad \text{Eq. 5}$$

Switching to MKS unit system to calculate the power formulas, the following are the equivalents: $\rho$=1.225 kg/m³ (the air density at sea level and 15° C.) and v is the velocity of the wind in m/sec. Area A is in m². (Note that from this point when we refer to wind or wind speed what is meant is the effective wind velocity v passing the rotors and not the actual wind $V_o$)

Thus at 8 m/sec. using equation Eq. 5 the maximum power is 314 watts. When the wind speed doubles we get a 8 factor increase in power, so that at 16 m/sec. power is 2,509 watts. This is where this invention shows its power. It can increase effective wind velocity to 4 times the apparent wind speed, thus: $v_1=4 V_o$ and the increase in maximum power is an incredible $4^3=64$ times the power of conventional rotor/turbines $$P_{Max.}=½\rho(4 V_0)^3 A=½\rho v_1^3$$

This is the maximum power that can be extracted from the wind velocity $v_1$ with no rotor blocking the wind using a rotor with area A, the equivalent swept area of a single rotor. Now let us make the equivalent rotor area the same as the area of the total of all the vents. Over time the amount of air entering the tower and passing the turbine rotors must equal the amount that's escaping from the vents.

The turbine rotors must obviously slow down the wind as it captures its kinetic energy and converts it to rotational energy. This means that the wind will be moving more slowly after it passes the rotor. Since the amount of air entering through the swept area must be the same as the air leaving the rotor area, the air will occupy a larger cross section diameter behind the rotor plane.

Figure 8:
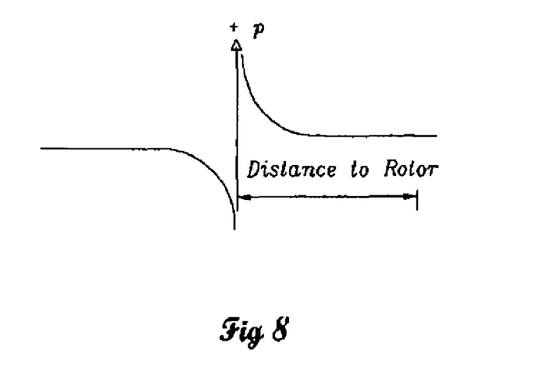
FIG. 8 shows a graph of the air pressure plotted vertically while the horizontal axis indicates the distance from the rotor plane. The wind is coming from the right and the rotor is at the point of discontinuity. As the wind approaches the air pressure increases gradually since the rotor acts as a barrier to the wind. Note that the air pressure will drop immediately behind the rotor plane and then gradually increases to the ambient air pressure.

Graph FIG. 8 shows the air pressure plotted vertically while the horizontal axis indicates the distance from the rotor plane. The wind is coming from the right and the rotor is at the point of discontinuity.

Figure 2:
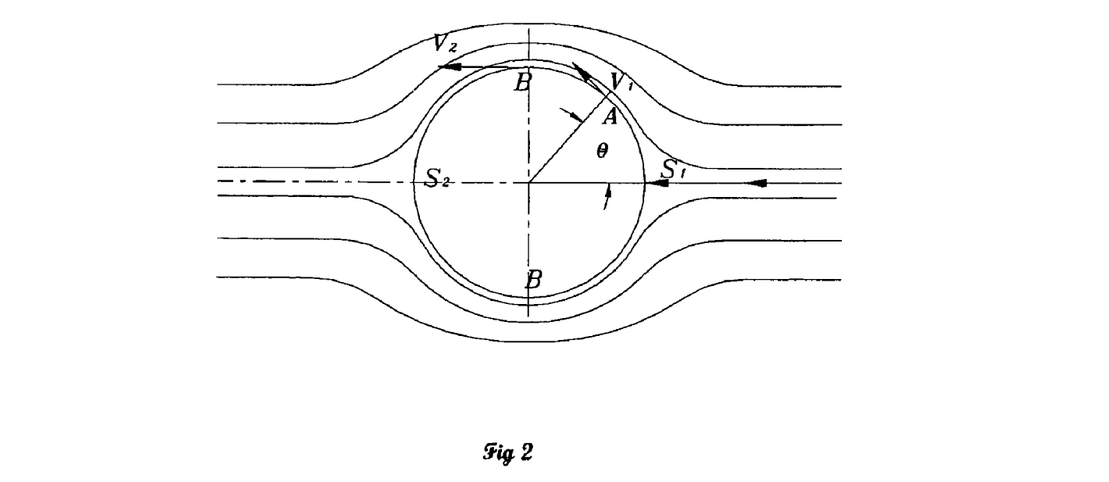
FIG. 2 represents the wind velocity at various points around the cylinder.

As the wind approaches the air pressure increases gradually since the rotor acts as a barrier to the wind. This is the equivalent of the stagnation pressure at $S_1$ on the cylinder in FIG. 2. Note that the air pressure will drop immediately behind the rotor plane and then gradually increases to the ambient air pressure. There should be a design difference between a typical rotor and one that is produced by the suction of the air drawing in the ambient air. The aerodynamic profile of the blades needs some modification in order to maximize power because of this peculiarity.

Let us make another reasonable assumption that the average wind speed through the rotor area is the average speed of the undisturbed air being drawn in before the rotor $v_1$ and the speed after passing the rotor plane, $v_2$, i.e. $(v_1+v_2)/2$ (Betz' law).

The mass m of the air streaming through the rotor during one second where A is the swept rotor area is:

$$m=\rho A(v_1+v_2)/2$$

The power extracted from the wind by the rotor is equal to the mass multiplied by the drop in the wind speed squared (according to Newton's second law) is:

$$P=\tfrac{1}{2}m(v_1^2-v_2^2)$$

Substituting for m we get the following for the power extracted from the wind:

$$P=(\rho/4)(v_1^2-v_2^2)(v_1+v_2)A \qquad \text{Eq. 6}$$

Comparing the result of maximum power from Eq. 5 with no rotor blocking the incoming air, call this $P_o$:

$$P_o=\tfrac{1}{2}\rho v_1^3 A \qquad \text{Eq. 7}$$

The ratio between the power we extract from the wind and the power in the undisturbed wind is:

$$(P/P_o)=(\tfrac{1}{2})(1-(v_2/v_1)^2)(1+(v_2/v_1)) \qquad \text{Eq. 8}$$

Figure 9:
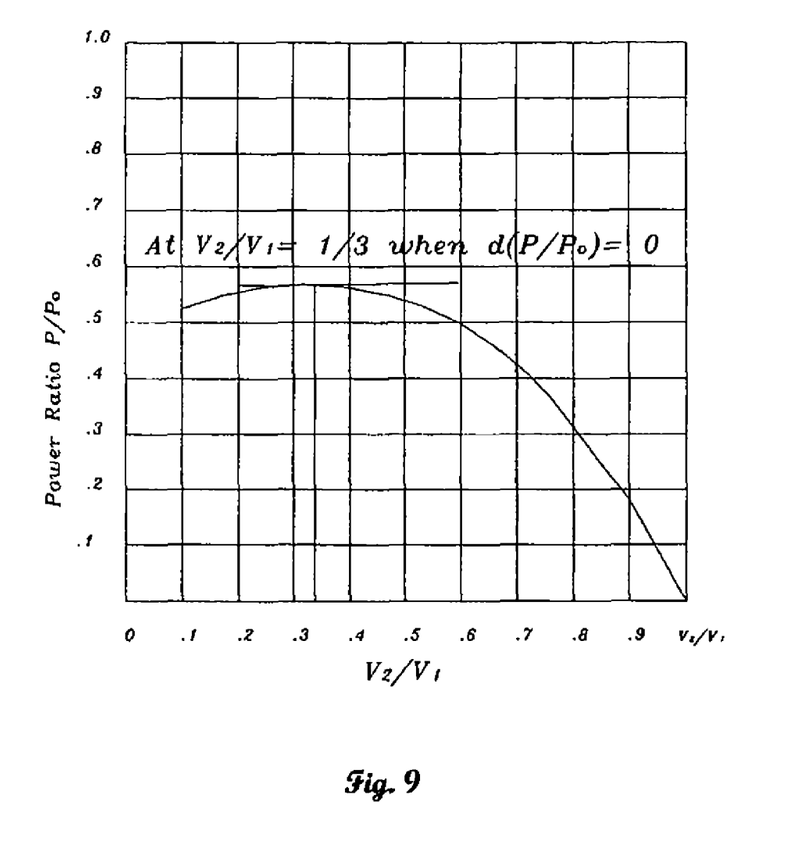
FIG. 9 represents the graph plotting P/Po as a function of $v_2/v_1$.

Plotting $P/P_o$ as a function of $v_2/v_1$ we get the graph FIG. 9:

We see from the graph FIG. 9, $P/P_o$ reaches its maximum for $v_2/v_1=\tfrac{1}{3}$. The maximum value of the power extracted is $C_{pmax.}=0.59$ or $16/27$ of the total power of the wind. This is the limit of a rotor in a typical horizontal turbine and it is called Betz' limit. With the power tower it is possible to exceed the Betz limit because the turbine is shrouded. The CFD analysis shows that when the rotor is placed in a diffuser, $C_{pmax.}$ can exceed the Betz limit and reach a maximum value of 0.9 with the results dependent on the actual diffuser geometry. This makes the power towers excluding other energy losses able to operate at 90% of maximum available power.

Now allowing for energy losses due to friction of the air rising in the tower include the energy needed to lift the air from ground to average vent height (even though the tower is a stack and tends to naturally lift air due to thermal differences between the ground and the colder air above). The most advanced turbines operate at $C_{pmax}=0.5$ and because the turbine rotors are shrouded and can thus operate at $C_{pmax}=0.9$ it is reasonable to use the Betz limit of $C_{pmax}=0.59$. From the graph FIG. 9 we see that it corresponds to $v_2/v_1=\tfrac{1}{3}$.

Thus $v_1=3\,v_2$ and substituting for $v_1$ in Eq. 6:

$$P=(\rho/4)((3v_2)^2-v_2^2)(3v_2+v_2)A$$

$$P=8\rho v_2^3 A \qquad \text{Eq. 9}$$

Since the equivalent MKS units are A=645 m² (this is the equivalent area of the turbines), $v_2$=15.65 m/sec for $v_1$=46.95 m/sec since $v_2$ is ⅓ of $v_1$, and $\rho$=1.225 kg/m³. Substituting these values in Eq 9 we get:

$$P=8(1.225 \text{ kg/m}^3)(15.65 \text{ M/sec})^3(645 \text{ m}^2)$$

$$P=24 \text{ MW}$$

This is an enormous power output of one tower using this radical new improvement in power generation. The area 640 m² can be made up of several turbines of much smaller diameter but adding up to the same area. To put this value in comparison to the most advanced titans of the turbine world, the 400 ft diameter turbine rotors on 600 ft high towers each generate only 5 MW. We see that the power towers are truly a significant advancement in the production of electrical power.

Thus the power tower generates 24 MW for an area of 640 m² or 134 MWh/m², while a conventional turbine/rotor generates 5 MW for an area of 11,680 m² or 1.54 MWh/m². The amount of land used is a small fraction of the land used by these megaliths as they need a separation distance of several rotor diameters. Two adjacent towers thus will produce 48 MW. These assumptions are based on one particular set of initial wind speed and mean wind direction, size and number of bleeder vents. It is possible that the power towers will perform better then these initial assumptions.

The Hybrid Wind/Gas-Turbine Power Plant

The biggest drawback to the current state of the art machines is that the investment is not productive when wind doesn't blow. This is another limiting factor that mandates that the bulk of power to the grid be produced from other sources. This generally means the burning of hydrocarbon based fuels. These sources include natural gas that fires a conventional gas-turbine and are part of a large electrical production plant that can generate 200 MW of power. These plants are located far from the wind farms and can not reduce or increase power to compensate for the variability of wind power. In this new power plant hybrid system the gas-turbines have the capability of reducing power to compensate for the increase of wind power. Control must be integrated between the two. The ideal power plant is one that can operate at 100% of the time. This can be done by combining the operations of the power tower with the gas-turbine in a synchronized system where increase in power of one will allow the gas-turbine to reduce power. The towers can function as a stack for a conventional gas-turbine producing electric power by burning fuel. Thus the towers are also chimneys.

In a conventional stack the air is lifted by the pressure difference between the top and the ambient pressure at the base opening. The invention can be further improved by exhausting the hot gas that is generated by the gas-turbine into the tower. When wind speeds allow, the bleeder vents can act as a more effectively heat sink then if the top of the towers were opened to the atmosphere.

Figure 10:
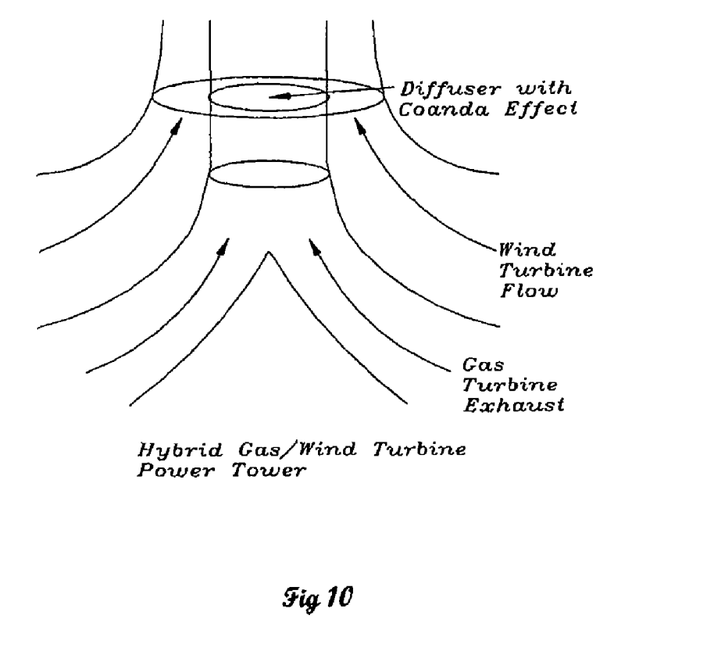
FIG. 10 represents a diffuser for a Hybrid Gas/Wind Turbine Energy Recovery by the Coanda Effect, when a smaller volume of high velocity air is converted into a large flow of ambient air.

This can be done by using a conventional gas turbine. Now the wasted hot air can also power the wind driven turbines. (See FIG. 10) When air is heated it will rise. The rising air will draw in the surrounding air through the turbine rotors. Thus the power towers can generate electrical power even when the wind does not blow or when wind speeds are too low to generate power by burning hydrogen enhanced fuel or natural gas. This is done as a hybrid system of wind and fuel. The control of this plant is centralized and coordinated in a single control system. The invention requires a careful study of the thermodynamics of this complex system. Its parameters are: mixing hot exhaust from a gas turbine and accelerating the air drawn from the wind turbines. The bleeder vents act as exhaust ports for the rising hot air exhausted from a fuel fired turbine and the cooler ambient air drawn in by the "Coanda Effect". Coanda Effect is when a smaller volume of high velocity air is converted into a large flow of ambient air. The hot exhaust air passes over a curved surface, similar to an airfoil; a low pressure area is created inducing the ambient air to flow into the throat with the high velocity exhaust air. The combined operation of a drop in pressure generated by the tower as an airfoil, and the drop in pressure by the "Coanda Effect" of the exhausted hot air causes an overall increase in the tower's internal pressure while at the surface of the tower's interior a pressure drop is experienced because of the high velocity of the column of moving air. The shape of the interior of the bleeder vents then affects the performance of the turbines and again augments the movement of air across the turbine rotors located at the base of the power tower.

The process of operating a hybrid wind/gas-turbine power plant is to burn an oxygen-containing gas (ambient air) compress it and heated it while admixing a fuel. The hot gas produced expands in a gas turbine to perform work and is then discharged to a stack. The exhaust is characterized at an essentially constant flow rate, is decelerated in the region of the outlet (stack with diffuser) and the pressure conditions produced by the bleeder vents and wind result upstream as lower pressure. The accelerated hot gas (pressure drop) of the combined flow is transmitted back via the flow path to the exit of the gas turbine and also to the wind turbines.

The combined hybrid wind/gas-turbine power plant designed for realizing this method is equipped with a diffuser unit, which as a rule is designed as a stack, by means of a diffuser unit the combined exhaust gas and ambient air is decelerated. Its flow velocity is reduced with low losses by means of widening of the cross section of flow. The pressure in the region of the decelerated exhaust gas increases, relative to the atmospheric pressure which mixes using the diffuser unit downstream and leads to a considerable pressure reduction upstream of the diffuser. The flow path between the turbine exit and the outlet equipped with the diffuser unit are designed so as to be air-tight relative to the ambient pressure. The reduced pressure occurring upstream of the diffuser unit inside the outlet is able to transmit it to the gas-turbine exit. Thus the gas turbine works against a lower back pressure. This results in higher efficiency of the gas turbine since it doesn't have to work against atmospheric pressure, as in the case of conventional gas-turbine plants of open design, but against a pressure level which is reduced compared with the atmospheric pressure. At the same time because of the high velocity of the exhausted gas the wind turbines are powered by the waste gas.

Figure 11:
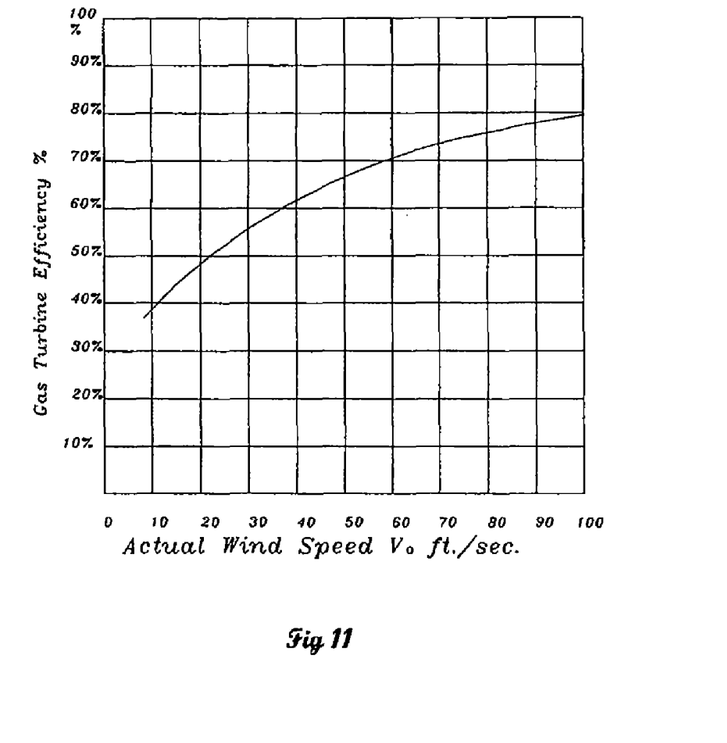
FIG. 11 represents a graph showing the increased efficiency of a gas turbine because of reduced pressure at the exhaust end due to the increased wind speed and Coanda Effect of the diffuser.
Figure 12:
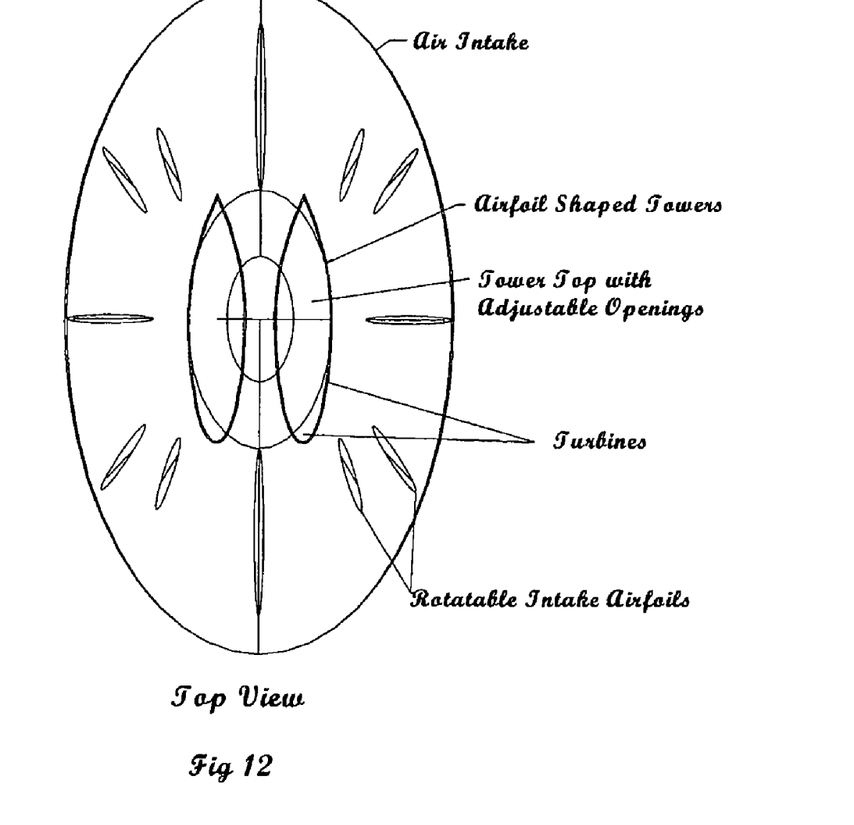
FIG. 12 Top View of two adjacent airfoil shaped towers defining a channel having a flow accelerating constriction, fluid drivable engines (wind turbines) exterior to the channel (separate intake) and tower top with adjustable openings for the towers to act as stacks for the gas turbines.
Figure 13:
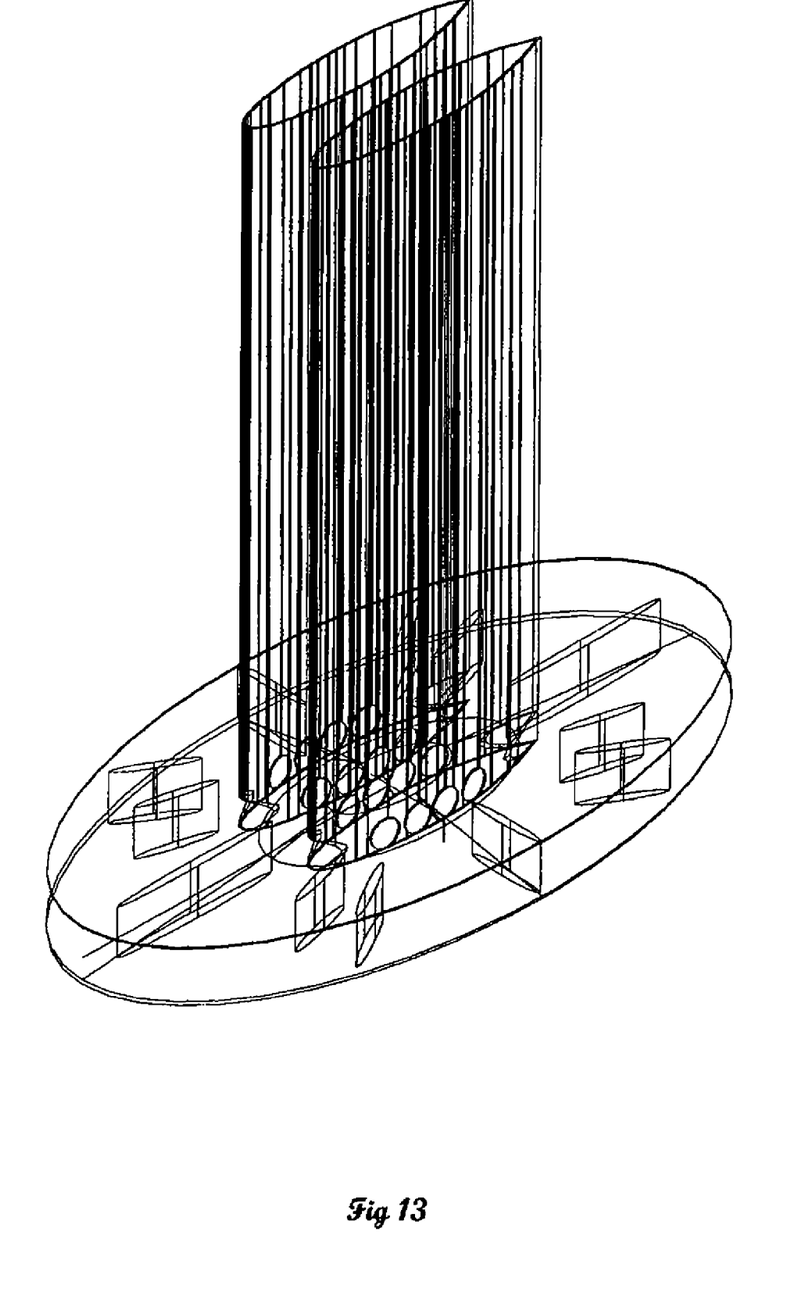
FIG. 13 Isometric View of two adjacent airfoil shaped towers defining a channel having a flow accelerating constriction, fluid drivable engines (wind turbines) exterior to the channel (separate intake) and tower top with adjustable openings for the towers to act as stacks for the gas turbines.
Figure 14:
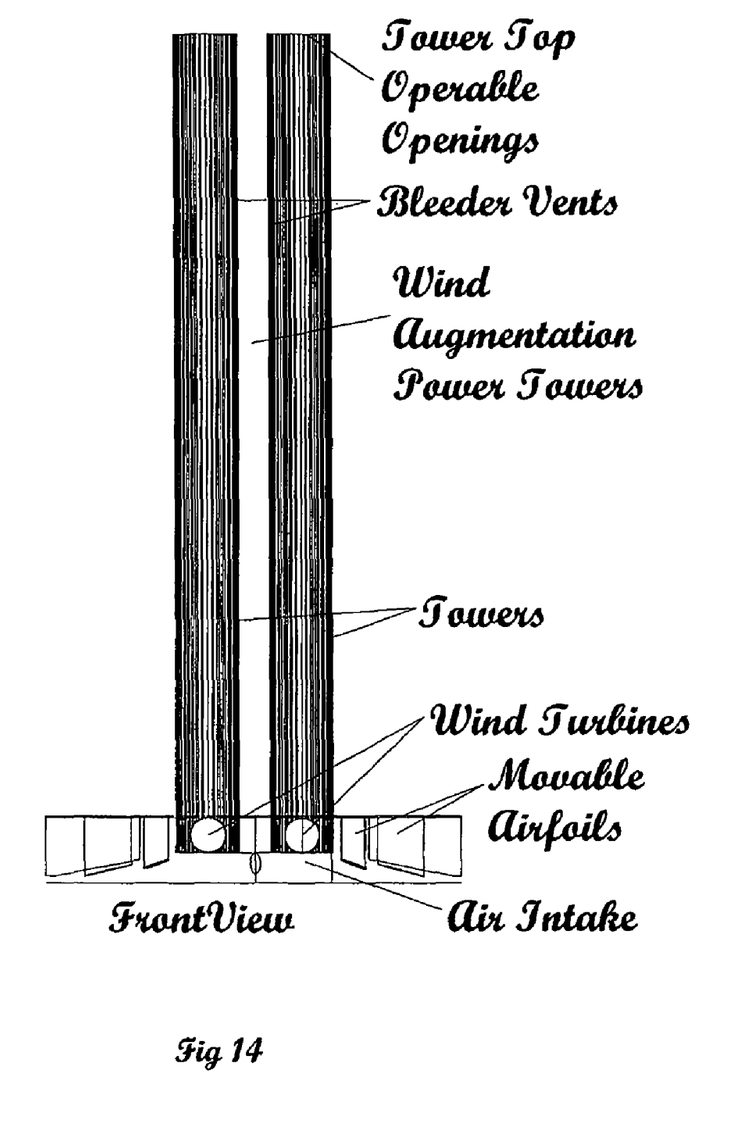
FIG. 14 Front View of two adjacent airfoil shaped towers defining a channel having a flow accelerating constriction, fluid drivable engines (wind turbines) exterior to the channel (separate intake with accelerating constriction) and tower top with adjustable openings for the towers to act as stacks for the gas turbines.
Figure 15:
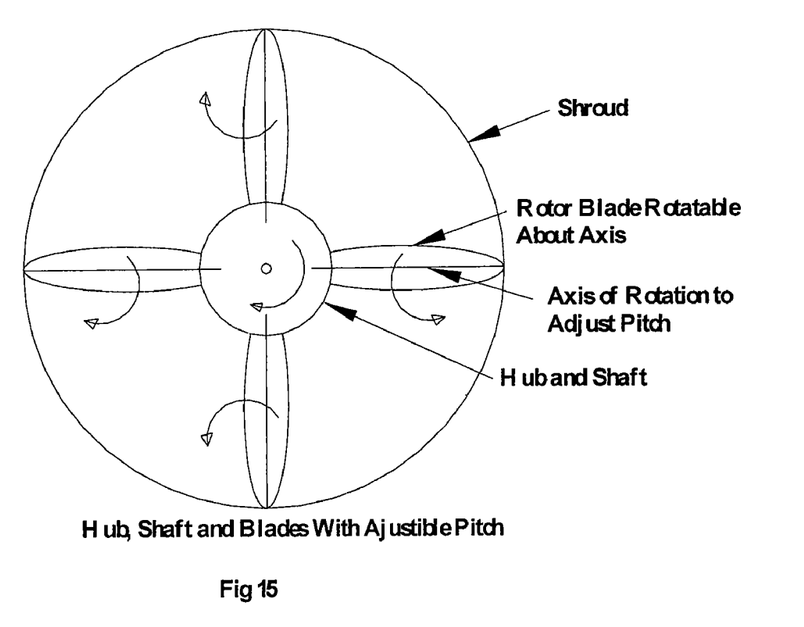
FIG. 15 is a plan view of a shroud rotor wind turbine including a hub and a shaft with blades, where the pitch of the blades is adjustingly variable.
Figure 16:
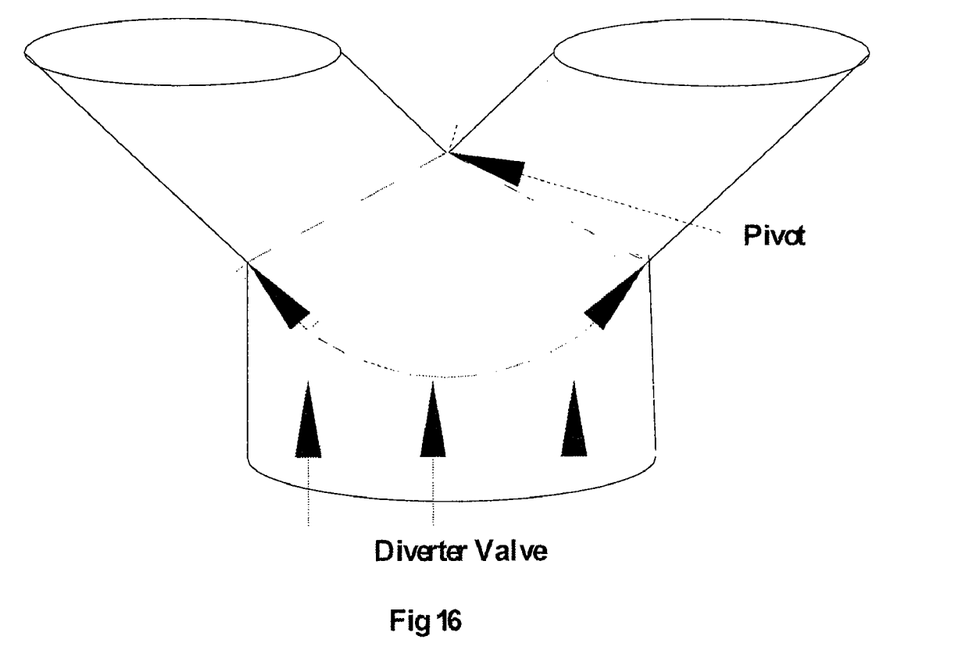
FIG. 16 is a perspective view of a ducted diverter valve including its pivot point.

The overall efficiency of a conventional gas-turbine power plant is relatively high (from 50 to 60%), is further increased according to the invention, utilizing the kinetic energy inherent in the exhaust-gas flow. It is not necessary to use movable components susceptible to wear for realizing the increased technical overall efficiency, as is the case, for example, with the operation of a fluid-flow machine installed in the exhaust-gas duct. A typical gas turbine producing 40 MW of electric power has the ability to burn a variety of fuels, including natural gas, distillate oil and low BTU fuels which can be enhanced by the addition of hydrogen. From a GE press release the heat rate is 9,930 kJ/kWh and the exhaust flow is 117 kg/sec and velocity is between 10 and 40 m/sec. The exhaust temperature is 1,065° F. (574° C.). The wasted heat is often used to power a boiler that drives a steam turbine which also produces electrical power. It is this wasted heat moving at a high velocity that can be used with a diffuser to move the ambient air by the "Coanda Effect" in a hybrid system. The bleeder vents will act as a more efficient heat sink then if the top of the tower was open as in a conventional chimney effect. These advanced gas turbines operate at a relatively high 60% efficiency. The hybrid system using wind and fuel, the gas-turbines could reach 80% efficiency. (FIG. 11)

This complex system can be assembled in numerous ways. Control system could include the opening and closing of the bleeder vents to control the volume of air also the metering of the fuel to the gas turbine. Similarly controlling the opening and closing the opening at the top of the towers together with the input of fuel energy would allow the towers to operate 24 hours/day at peek efficiency even when wind doesn't blow.

Hydrogen which can be produced by electrolysis can be used as the fuel for the gas-turbines. Hydrogen can be stored and added to natural gas or some other fuel and burned by the gas turbine when the wind velocity is minimal. The complexity of this system may not be as efficient as the production of electricity by expensive fuel cells but because the wind and thus the hydrogen produced is free; efficiency is not a problem, thus the initial capital cost of construction is a more significant factor.

The basic idea of this hybrid system consists in utilizing the kinetic energy of the exhaust gas, discharging into the atmosphere and using the drop in pressure generated by the wind for producing a lower pressure in the tower than ambient air. The bleeder vents act as conduits lowering the internal pressure and in maintaining this low pressure over the entire flow path down-stream of the gas-turbine in order to build up in this way a lower back pressure behind the turbine. Thus the gas turbine does not have to perform work against atmospheric pressure as is normal in conventional plants. The difference in pressure at the gas turbine as a result of this measure is reflected in an increased output and thus increased overall efficiency of the gas-turbine power plant. FIG. 11.

Water Towers

The same arguments for drops in pressure and increase in effective velocity can be made for towers anchored to the sea floor. Water has a much higher density thus the turbines can be smaller and more efficient. For example, in a development funded by the European Union plans are to set up submarine propeller-driven turbines in selected locations where the current flows are high. The U.S. Navy is experimenting with submerged turbines of 30 ft diameter. Ocean currents entering the Gulf of Mexico move at 5 miles/hour. These same turbines can be part of an underwater tower. They would be similarly located at the base of the tower as the ones of the above surface towers.

In another embodiment of the invention for an underwater hydrofoil tower is the mixing of air with water to decrease its viscosity. This raises the buoyancy of the air entrained water which will rise in the interior of the tower and accelerate upward. The rising water will draw in more water to power the submerged rotor/turbines. The air would lower the water density, making the water rise faster. A fuel gas-turbine could produce high pressure air which is be pumped to the base of the submerged tower. Thus a hybrid air-water power system is combined with bleeder vents as in the power towers. The bleeder vents again are used to conduct the rising water to the lower pressure exterior of the hydrofoil shaped towers.

Hybrid Wind/Solar Tower Technology

In the early 1980s, Professor Jörg Schlaich designed the Solar Tower power plant, bringing together three well-known principles: The use of the sun's radiation to heat a large body of air (solar collector), also hot air rises (as through a chimney); and movement of air as energy source to drive large turbines to generate electricity. The power towers can also use a combination of solar and wind as a separate embodiment of a hybrid solar/wind system. The basic idea of this hybrid system consists in utilizing the solar energy of a very large solar collector and discharging the hot air into the atmosphere using the drop in pressure generated by the wind by the bleeder vents for producing a lower pressure in the tower than ambient air. The bleeder vents act as conduits lowering the internal pressure and in maintaining this low pressure over the entire flow path down-stream to the wind turbines in order to build up in this way a lower back pressure behind the turbines. Wind speed allowing, the solar heated air is effectively accelerated by the pressure drop generated by the wind than if the stack is only open at the top. When wind speeds allow the bleeder vents will act as a more efficient heat sink then if the top of the tower was open as in a conventional chimney effect. Control of the opening and closing of the tower top and opening and the closing of bleeder vents can optimize the production of power by the turbines located at the base of the tower.

Hydrogen Economy

As of this writing the cost of oil has reached $70/barrel and gasoline is $3/gal. The supply of oil from the Middle East is at best unstable and could end abruptly. The oil that is now the lifeblood of the economy and transportation is reduced in importance. The new lifeblood will be the unstoppable wind. It will be the wind that will power the new century. The power towers will make it economical to build even in locals where wind turbines are not now economically sustainable. The wind will produce hydrogen that will power the fuel cell cars of the future. Hydrogen need not be produced by using hydrocarbon feed stocks like oil or gas. This is also the most eco-friendly solution. It's only byproduct will be water from a car without a tail pipe.

The so called "hydrogen economy" can become a reality. There is no need to deliver hydrogen with trucks. Hydrogen can be produced at home or purchased at former gasoline stations. Hydrogen generating electrolyzers can produce hydrogen fuel (high purity and pressure) anywhere electricity and water are available, they utilize electrolysis with a simple fluid electrolyte. Electrolyzers can produce the high-pressure hydrogen needed for efficient storage and distribution, without a separate compressor. The correct size of the towers, shape of the airfoil, height and diameter of the turbines, size and design of the vents can be changed and optimized by Computational Fluid Dynamics (CFD) but the factors claimed are essential to the basic working of the power tower.

What is claimed is:

1. An apparatus for extracting power from the wind comprising:
   at least one fluid directing formation to define a channel having a flow accelerating constriction shaped such that the air flows through the channel and is caused to accelerate as it flows through the flow accelerating constriction of the channel;
   a fluid drivable engine disposed at a position exterior to the channel;
   a conduit disposed to provide fluid communication between the fluid drivable engine, an open end of said conduit extending into said flow accelerating constriction and a portion of the channel having an accelerated fluid flow, the fluid drivable engine being arranged such that fluid flow along the conduit caused by reduced pressure at the open end of the said conduit acts to drive the fluid drivable engine, wherein said flow accelerating constriction includes at least one airfoil shaped formation or a plurality of airfoils defining at least one channel or a plurality of channels having flow accelerating constrictions.

2. The apparatus of claim 1, further comprising a plurality of fluid drivable engines arranged with rotor blades fixedly connected to a hub and a shaft arranged to transmit power to an electric generator.

3. The apparatus of claim 2, wherein said blades are shrouded in an air-tight manner relative to the atmosphere.

4. The apparatus of claim 3, further comprising an outlet connecting to a shrouded rotor and designed as a diffuser discharging from a 90-degree radial diffuser.

5. The apparatus of claim 2, wherein said rotor blades each include a first portion fixedly connected to the hub and a second portion rotatable about an axis to adjust the pitch.

6. The apparatus of claim 5, further comprising a control system for adjusting the pitch of variable-pitch angle blades in a wind turbine generating electric power and for maintaining dynamic stability under all conditions, wherein at low wind speeds said control system maintains the pitch of said blades at an angle close to the value providing maximum torque, and at high wind speeds said control system adjusts the pitch of said blades to maintain rated power.

7. The apparatus of claim 1, wherein the conduit disposed to provide communication between the fluid drivable engines and said flow accelerating constriction includes a plurality of conduits each corresponding to different fluid drivable engines and branching to conduits that connect to a plurality of bleeder vents extending into the flow accelerating constriction.

8. The apparatus of claim 7, further comprising a plurality of bleeder vents extending into the flow accelerating constriction of the channel designed as diffusers.

9. The apparatus of claim 7, wherein said plurality of conduits branching to other conduits connect with diverter valves.

10. The apparatus of claim 9, further comprising a control system of opening and closing diverter valves for maintaining dynamic stability under all conditions, wherein at low wind speeds said control system maintains the rated air flow of said conduits at a condition close to the value providing maximum torque, and at high wind speeds said control system adjusts the opening of the diverter valves of said conduits to maintain rated power.

11. The apparatus of claim 1, wherein said conduit is constructed as an inlet of said wind communicating conduit having an accelerating constriction.

12. The apparatus of claim 1, further comprising a fluid directing formation arranged to rotate to adjust for changing wind direction.

13. The apparatus of claim 12, further comprising a control system for adjusting the angle of the fluid directing formation relative to the changing wind direction to maintain the direction at a condition close to the value providing maximum torque.

14. A method of operating a hybrid wind/gas-turbine power plant comprising the steps of:
   directing at least one fluid formation to define a channel having a flow accelerating constriction shaped such that air flows through the channel and is caused to accelerate as it flows through the flow accelerating constriction of the channel;
   providing a fluid drivable engine disposed at a position exterior to the channel;
   providing a conduit disposed to provide fluid communication between the fluid drivable engine, an open end of said conduit extending into said flow accelerating constriction and a portion of the channel having an accelerated fluid flow, the fluid drivable engine being arranged such that fluid flow along the conduit caused by reduced pressure at the said open end of the said wind communicating conduit acts to drive the fluid drivable engine;
   positioning a gas-turbine power plant exterior to the channel, said gas-turbine power plant comprising an oxygen-containing gas drawn in and compressed and heated while admixing with a fuel, and the hot gas produced expands in the gas-turbine to perform work and then discharging from the gas turbine in an outlet conduit via a flow path, characterized in that the exhaust-gas flow is decelerated in a region of a diffuser with Coanda Effect, and wherein the pressure conditions produced are transmitted back via the conduit flow path to the fluid drivable engine in an air-tight manner relative to the atmosphere; and positioning a gas-exhaust conduit in fluid communication between the discharging end of the gas-turbine and connected with the wind communicating conduit, the fluid drivable engine and gas-turbine being arranged such that fluid flow along the gas-exhaust conduit is caused to mix with the bypass air of the wind communicating conduit by the Coanda Effect, so as to drive the fluid drivable engine and the reduced pressure at the open end of said conduit connecting to the flow accelerating constriction resulting in reduced pressure at the discharging end of the gas-turbine.

15. The method of claim 14, further comprising the step of positioning a plurality of fluid drivable engines arranged with rotor blades fixedly connected to a hub and a shaft arranged to transmit power to an electric generator.

16. The method of claim 15, further comprising the step of providing rotors constructed with blades shrouded in an air-tight manner relative to the atmosphere.

17. The method of claim 16, further comprising the step of providing said rotor blades each with a first portion fixedly connected to the hub and a second portion rotatable about an axis to adjust the pitch.

18. The method of claim 17, further comprising the step of adjusting the pitch of variable-pitch angle blades in fluid drivable engine for generating electric power and for maintaining dynamic stability under all conditions, wherein at low wind speeds said control system maintains the pitch of said blades at an angle close to the value providing maximum torque, and at high wind speeds said control system adjusts the pitch of said blades to maintain rated power.

19. The method of claim 14, further comprising the step of decelerating the gas-turbine exhaust-gas flow in a region of a diffuser described as an axial diffuser discharging from a 90-degree radial diffuser.

20. The method of claim 19, further comprising the step of arranging the axial diffuser as a series of concentric cone shaped diffusers discharging to other cone shaped diffusers having a uniform cross section form that achieves a diffuser effect in interaction with a flow-limiting wall and increasing in cross sectional area by a predetermined angle in the direction of the flow.

21. The method of claim 20, further comprising the step of constructing the flow limiting wall of the diffuser of a plurality of overlapping semi-conical sections expanding in profile and arranged with gaps between overlapping sections, wherein said gaps connect the gas-exhaust conduit with the wind communicating conduit arranged with diverter valves for adjusting the mixing action of said turbine exhaust stream and said wind communicating air stream so that the hot high velocity gas-exhaust moving over the flow-limiting wall of said diffusers induces ambient air flow in said wind communicating conduit connected to communicate the lower pressure to the fluid drivable engines by the Coanda Effect.

22. The method of claim 21, further comprising the step of arranging the flow limiting wall to impart a rotating flow as in a skewed diffuser geometry for mixing a substantial portion of turbine exhaust stream and wind communicating air stream to produce a combined mixed exhaust stream, said flow-limiting wall forming a plurality of twisted flow surfaces, said twisted flow surfaces having upstream and downstream ends and having a predetermined and progressive degree of twist between said upstream and said downstream ends, peripherally adjacent ones of said flow limiting wall being of mutually complementary and opposite twists to define said outwardly and inwardly directed flow, said twisted flow surfaces providing a Coanda Effect to those portions of said turbine exhaust stream and said wind communicating air stream flowing over said flow surfaces to deflect said stream portions without said stream portions breaking away from said flow-limiting wall and generating multiple vortices of a mixed turbine exhaust stream and wind communicating air stream, adjacent circumferential vortices being counter-rotating to promote further mixing, thereby producing a mixing action substantially throughout said combined exhaust stream.

23. The method of claim 22, further comprising the step of arranging the combined exhaust system with diverter valves to alternatively exhaust to a series of branching connected conduits that defuse the combined airflow to a plurality of bleeder vents connecting to the flow accelerating constriction or to the gas-exhaust conduit that forms a stack.

24. The method of claim 23, further comprising the step of extending said plurality of bleeder vents into the flow accelerating constriction of the channel designed as diffusers.

25. The method of claim 23, further comprising the step of providing said gas-exhaust flow conduit outlet that forms a stack with a diverter valve to exhaust to the atmosphere or alternately to the bleeder vents extending into the flow accelerating constriction.

26. The method of claim 25, further comprising the step of providing the outlet of the stack as a diffuser.

27. The method of claim 25, further comprising the step of adjusting the opening and closing of the diverter valves for maintaining dynamic stability under all conditions, wherein at low wind speeds said control system maintains the diverter valves at an angle close to the value providing maximum torque, and at high wind speeds said control system adjusts the angle of said valves to maintain rated power.

28. The method of claim 21, further comprising the step of adjusting the mixing action of the said turbine exhaust stream and said wind communicating air stream for maintaining dynamic stability under all conditions.

29. The method of claim 14, further comprising the step of providing said flow accelerating constriction in the form of at least one airfoil shaped formation or a plurality of airfoils defining at least one channel or a plurality of channels having flow accelerating constrictions.

30. The method of claim 14, further comprising the step of providing the inlet of said wind communicating conduit as an accelerating constriction.

31. The method of claim 14, further comprising the step of providing a wind communicating conduit of at least one or a plurality of conduits corresponding to different fluid drivable engines.

32. The method of claim 14, further comprising the step of arranging the fluid directory formation to rotate relative to the changing wind direction.

33. The method of claim 32, further comprising the step of adjusting the rotation of the fluid directing formation to control the angle relative to the changing wind direction.

34. The method of claim 14, further comprising the step of providing a hybrid wind/gas-turbine power plant that combines gas-turbine and fluid drivable engine wherein total power output depends to a certain extent on the losses in the flow path of the hot gases and the pressure conditions produced by the accelerating constriction can operate in a controlled manner one dependent on the other or one independent of the other and each contributing its part to the total power output.

\* \* \* \* \*